United States Patent Office 3,694,357
Patented Sept. 26, 1972

3,694,357
LUBRICATING OIL
Edward F. Zaweski, Pleasant Ridge, Mich., assignor to Ethyl Corporation, New York, N.Y.
No Drawing. Filed Apr. 19, 1971, Ser. No. 135,418
Int. Cl. C10m 1/38
U.S. Cl. 252—48.2      5 Claims

ABSTRACT OF THE DISCLOSURE

Reaction of hydrogen sulfide with the hemi-quinone of a methylene bisphenol results in a tetranuclear phenol in which two molecules of the methylene bisphenol are bridged at their methylene groups through a sulfur atom. These are thiodimethylidyne tetrakisphenols. The compounds are useful as antioxidants in synthetic and mineral lubricating oil.

BACKGROUND

Many organic materials undergo oxidative or thermal degradation on aging or exposure to high temperatures. The problem is particularly acute in the plastic, rubber and petroleum industries. For example, lubricating oils, both mineral and synthetic, must be stabilized against degradation at the increased temperatures encountered in modern reciprocating engines and turbines. In my prior applications, Ser. No. 674,646 and Ser. No. 879,597, now U.S. 3,522,315 and U.S. 3,567,682, I disclosed new compounds which are very effective antioxidants in lubricating oils.

SUMMARY

This invention relates to a process for making thiodimethylidyne tetrakisphenols and to the use of these compounds as antioxidants in a broad range of lubricating oils.

An object of this invention is to provide new antioxidants and a process for their manufacture. A further object is to provide a means of stabilizing lubricating oils against oxidative degradation. These and other objects are accomplished by providing a compound having the formula:

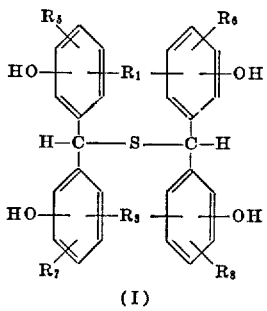

(I)

wherein $R_1$, $R_2$, $R_3$ and $R_4$ are selected from the group consisting of $C_{1-20}$ alkyl radicals, $C_{6-20}$ aryl radicals, $C_{1-20}$ aralkyl radicals, and $C_{6-20}$ cycloalkyl radicals, and $R_5$, $R_6$, $R_7$ and $R_8$ are selected from the group consisting of hydrogen and the same group as $R_{1-4}$.

Some examples of these compounds are:

2,2′,2″,2‴-(thiodimethylidyne)tetrakis(4,6-di-tert-butylphenol)
2,2′,2″,2‴-(thiodimethylidyne)tetrakis(4-methyl-6-tert-butylphenol)
4,4′,4″,4‴-(thiodimethylidyne)tetrakis(6-tert-butyl-m-cresol)
2,2′,2″,2‴-(thiodimethylidyne)tetrakis(5-methylphenol)
4,4′,4″,4‴-(thiodimethylidyne)tetrakis[6-(α-methylbenzyl)-o-cresol]
2,2′,2″,2‴-(thiodimethylidyne)tetrakis(3,6-di-tert-butylphenol)
4,4′,4″,4‴-(thiodimethylidyne)tetrakis(2-cyclohexylphenol)
4,4′,4″,4‴-(thiodimethylidyne)tetrakis(6-sec-dodecyl-o-cresol)
2,2′,2″,2‴-(thiodimethylidyne)tetrakis(4-sec-eicosylphenol)
4,4′,4″,4‴-(thiodimethylidyne)tetrakis[2-(α-naphthyl)-6-(3-phenanthryl)-phenol]

In a more preferred embodiment, the thiodimethylidyne tetrakisphenols have at least one substituent ortho to each phenolic hydroxyl radical and each phenolic group is bonded to the methylene bridge at its para position. These compounds have the formula:

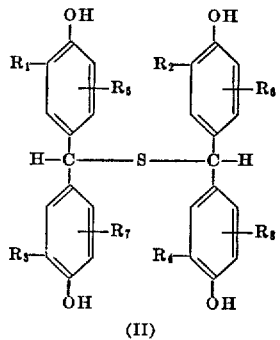

(II)

where $R_{1-8}$ are selected from the same groups defined in Formula I.

Typical examples of these compounds are:

4,4′,4″,4‴-(thiodimethylidyne)tetrakis(2-tert-butylphenol)
4,4′,4″,4‴-(thiodimethylidyne)tetrakis[6-(α-methylbenzyl)-o-cresol]
4,4′,4″,4‴-(thiodimethylidyne)tetrakis(6-cyclohexyl-m-cresol)
4,4′,4″,4‴-(thiodimethylidyne)tetrakis(6-isopropyl-o-cresol)
4,4′,4″,4‴-(thiodimethylidyne)tetrakis(2,6-dimethylphenol)
4,4′,4″,4‴-(thiodimethylidyne)tetrakis(6-phenyl-m-cresol)
4,4′,4″,4‴-(thiodimethylidyne)tetrakis[2-(α,α-dimethylbenzyl)phenol]
4,4′,4″,4‴-(thiodimethylidyne)tetrakis(2-sec-eicosyl-5-ethylphenol)
4,4′,4″,4‴-(thiodimethylidyne)tetrakis(2-cyclooctyl-6-cycloheptylphenol)

In a highly preferred embodiment, the phenolic hydroxyl radicals are sterically hindered. These compounds have the formula:

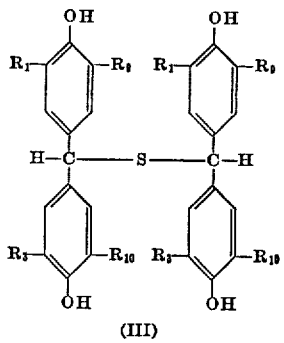

(III)

wherein $R_1$ and $R_3$ are selected from the same group previously defined and $R_9$ and $R_{10}$ are selected from the group consisting of $C_{3-20}$ alpha-branched alkyl radicals, $C_{6-20}$ cycloalkyl radicals, and $C_{8-20}$ alpha-branched aralkyl radicals. Examples of these compounds are:

4,4',4'',4'''-(thiodimethylidyne)tetrakis(6-tert-butyl-o-cresol)

4,4',4'',4'''-(thiodimethylidyne)tetrakis(2,6-di-sec-butylphenol)

4,4',4'',4'''-(thiodimethylidyne)tetrakis[2,6-di-(α-methylbenzyl)phenol]

4,4',4'',4'''-(thiodimethylidyne)tetrakis(2,6-dicyclohexylphenol)

4,4',4'',4'''-(thiodimethylidyne)tetrakis(6-sec-eicosyl-o-cresol)

4,4',4'',4'''-(thiodimethylidyne)tetrakis(2,6-diisopropylphenol)

4,4',4'',4'''-(thiodimethylidyne)tetrakis[6-(α,α-dimethylbenzyl)o-cresol]

4,4',4'',4'''-(thiodimethylidyne)tetrakis(2,6-di-tert-octylphenol)

4,4',4'',4'''-(thiodimethylidyne)tetrakis(2-phenyl-6-tert-butylphenol)

4,4',4'',4'''-(thiodimethylidyne)tetrakis[2-(3,5-di-tert-butylphenyl)-6-isopropylphenol]

The most preferred additive is 4,4',4'',4'''-(thiodimethylidyne)tetrakis(2,6-di-tert-butylphenol).

Additives of this invention are made by reacting a hemiquinone selected from compounds having the formula:

(A)

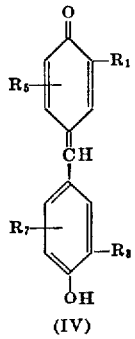

(IV)

wherein $R_1$, $R_3$, $R_5$ and $R_7$ are selected from the same groups as defined in Formula I, and (B)

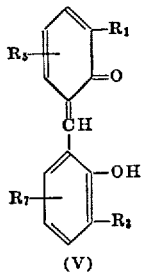

(V)

wherein $R_1$, $R_3$, $R_5$ and $R_7$ are selected from the same groups as defined in Formula I with hydrogen sulfide at a temperature of from about 0–250° C. Methods of carrying out this preparation are described in detail in U.S. 3,522,315, incorporated herein by reference.

The following example serves to illustrate the methods of making the thiodimethylidyne tetrakisphenols. All parts are by weight unless otherwise specified.

Example 1

In a reaction vessel fitted with stirrer and means for introducing hydrogen sulfide was placed 16 parts of 2,6-di-tert-butyl-4-(3,5 - di-tert-butyl-4-hydroxybenzylidene)-2,5-cyclohexadiene-1-one and 50 parts of toluene. There was then added 0.5 part of concentrated hydrochloric acid and, while stirring, hydrogen sulfide was bubbled through the solution at room temperature for 3 hours. The solvent was then evaporated off under vacuum, leaving a brown-orange solid. This was recrystallized from isopropanol, yielding 13 parts of 4,4',4'',4'''-,thiodimethylidyne)tetrakis(2,6-di-tert-butylphenol) (M.P. 240–243), identified by elemental analysis and molecular weight determination.

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene, and iron carbonyl have appreciably increased stability when treated with the additives of this invention. Furthermore, lubricating oils an functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are useful antioxiants in both mineral and synthetic lubricating oils. Examples of mineral lubricating oils include those refined from any crude oil such as Pennsylvania, midcontinent, gulfcoast, California, and the like. The synthetic lubricants include both the hydrocarbon type and the other various types of synthetic lubricants. Hydrocarbon synthetic lubricants are generally polyolefin oligomers or alkylated aromatics. Examples are polybutene oligomers, styrene isobutylene copolymers, α-decene trimers, mixtures of alkylated benzenes from $C_{12-26}$ olefins and having an average molecular weight of 450, and the like. These polyolefin oligomers are readily prepared from the appropriate olfin by standard oligomerization catalysts such as aluminum chloride, boron trifluoride, diethyl aluminum chloride, ethyl aluminum sesquichloride, combinations of aluminum alkyls and metal salts such as diethyl aluminum chloride-titanium tetrachloride, ethyl aluminum sesquichloride-butyl vanadates, triethyl aluminum-zirconium, iodides, and the like.

The alkylated aromatics are made by alkylating aromatics such as benzene, toluene, naphthalene, and the like, with olefin mixtures preferably containing $C_{12-32}$ olefins. Catalysts such as $AlCl_3$ and $BF_3$ are effective and the average molecular weight of the product should be from about 300 to 600.

The additives are very effective in synthetic ester type lubricants including monoesters, diesters, complex esters, and the like. Some examples are $C_{5-10}$ aliphatic monocarboxylic acid esters of trimethylolpropane, n-hexanoic ester of pentaerythritol, $C_{5-9}$ aliphatic monocarboxylic esters of equal mole mixtures of trimethylolpropane and pentaerythritol, adipic acid diesters of $C_{7-12}$ monohydric alkanols, complex esters formed by esterifying mixtures of polyols, dicarboxylic acids and monocarboxylic acids. For example, a useful complex ester is formed by condensing adipic acid, ethyleneglycol and a $C_{5-10}$ mixture of aliphatic monocarboxylic acids. Another complex ester is formed from trimethylolpropane, adipic acid and $C_{10-12}$ fatty alcohol mixtures. In essence, the complex esters are condensation products of polycarboxylic acids, polyols, and either monocarboxylic acids or monohydric alkanols, or both.

Other synthetic lubricants include the polyakyl siloxanes, polyalkyl silicates, alkyl silicones, polyfluoro hydrocarbons, polyaryl ethers, polyalkoxy aryls, polyglycols, and the like.

The lubricant compositions are prepared by merely blending an antioxidant amount of the additive with the oil. An effective amount is usually from about 0.05 to 5 weight percent, although more or less can be beneficially employed.

The lubricant compositions can include the other ingredients normally added to formulated lubricants. For example, mineral oil and synthetic hydrocarbon oil lubricants generally include zinc dialkyldithiophosphates, calcium alkyl sulfonates, overbased calcium sulfonates containing colloidal calcium carbonate, calcium phenates, other antioxidants such as 4,4'-methylenebis-(2,6-di-tert-butylphenol), 2,6-di-tert-btuyl-α-dimethyl amino-p-cresol, phenylene diamines, barium phosphonates, polyalkyl methacrylate VI improvers, dispersants such as the high molecular weight alkenyl succinamides of ethylenepolyamine, and the like. Synthetic ester formulations may include phosphate ester wear inhibitors such as tricresyl phosphate, phenyl dicresyl phosphate, and the like, antioxidants such as phenyl-β-naphthyl amine, phenylene diamines, phenothiazines, and the like, metal deactivators, silicone antifoam agents, and the like.

The following examples illustrate the preparation of some preferred lubricant compositions of this invention.

Example 2

In a blending vessel is placed 10,000 parts of solvent-refined, midcontinent, neutral mineral oil (100 SUS). To this is added 100 parts of zinc diisobutyl dithiophosphate, 150 parts of overbased calcium alkaryl sulfonate (300 base number), 200 parts of polylaurylmethacrylate VI improver, and 50 parts of 4,4',4'',4''',-(thiodimethylidyne)tetrakis(2,6-di-tert-butylphenol). Following this, 35 parts of N-polybutyl (molecular weight 900) nitrilotris ethylamine is added. The mixture is warmed to 50° C. and stirred until homogeneous, giving a lubricant of good stability suitable for use in automotive engines.

Example 3

In a blending vessel is placed 10,000 parts of a hindered ester lubricant made by esterifying trimethylolpropane with a mixture of C and $C_8$ n-aliphatic carboxylic acids. Following this, there is added 100 parts of phenyl-α-naphthylamine, 100 parts of 4,4',4'',4'''-(thiodimethylidyne - tetrakis-(2,6-di-tert-butylphenol), 10 parts of 1-salicylalaminoguanadine, 300 parts of tricresyl phosphate, and .05 part of dimethyl silicone. The mixture is warmed to 50° C. and stirred for 15 minutes. It is then filtered to give a stable synthetic ester lubricant suitable for use in turbines and turbojet engines.

The manner in which the additive is blended with the other lubricants mentioned is apparent from the foregoing examples.

Tests were carried out to demonstrate the effectiveness of the new antioxidants in protecting lubricating oils. These were Polyveriform Tests in which a neutral mineral oil containing a copper-lead bearing and lead bromide was heated to 300° F.and subjected to air injection for a 48-hour period. Degradation of the oil was shown by increase in Acid Number and viscosity and also bearing weight loss. Results obtained in this test using an oil containing 1 weight percent 4,4',44'',4'''-(thiodimethylidyne)tetrakis(2,6-di-tert-butylphenol) compared to a non-additive oil were as follows:

| Additive | Bearing wt. loss, mg. | Acid number increase | Percent viscosity increase |
|---|---|---|---|
| None | 135 | 17.9 | Solid |
| 4,4',4'',4'''-(thiodimethylidyne)tetrakis(2,6-di-tert-butylphenol) | 8 | 8.7 | 168 |

These results show the additives to be effective antioxidants in lubricating oil.

I claim:
1. Lubricating oil containing an antioxidant amount of a compound having the formula:

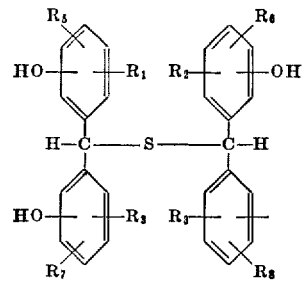

wherein $R_1$, $R_2$, $R_3$, and $R_4$ are selected from the group consisting of $C_{1-20}$ alkyl radicals, $C_{6-20}$ aryl radicals, $C_{1-20}$ aralkyl radicals, and $C_{6-20}$ cycloalkyl radicals, and $R_5$, $R_6$, $R_7$ and $R_8$ are selected from the group consisting of hydrogen and the same group as $R_{1-4}$.

2. A composition of claim 1 wherein said compound is a compound having the formula:

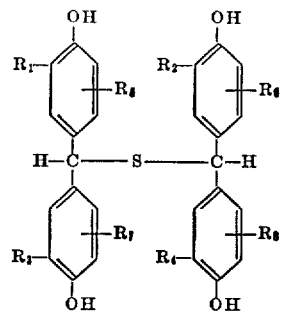

wherein $R_{1-8}$ are selected from the same groups defined in claim 1.

3. A composition of claim 2 wherein said compound is 4,4',4'',4''' - (thiodimethylidyne)tetrakis(2,6 - di-tert-butylphenol).

4. A composition of claim 1 wherein said lubricating oil is a mineral lubricating oil.

5. A composition of claim 3 wherein said lubricating oil is a mineral lubricating oil.

References Cited
UNITED STATES PATENTS 3,522,316 7/1970 Coleman et al. _____ 252—48.2
3,574,165 4/1971 Braus et al. _____ 252—48.2

DANIEL S. WYMAN, Primary Examiner

Y. H. SMITH, Assistant Examiner

U.S. Cl. X.R.

44—69, 76; 252—404, 386

UNITED STATES PATENT OFFICE
CERTIFICATE OF CORRECTION

Patent No. 3,694,357　　　　　　　　　Dated September 26, 1972

Inventor(s)　　　Edward F. Zaweski

It is certified that error appears in the above-identified patent and that said Letters Patent are hereby corrected as shown below:

Formula (I) in column 1 should read as follows:

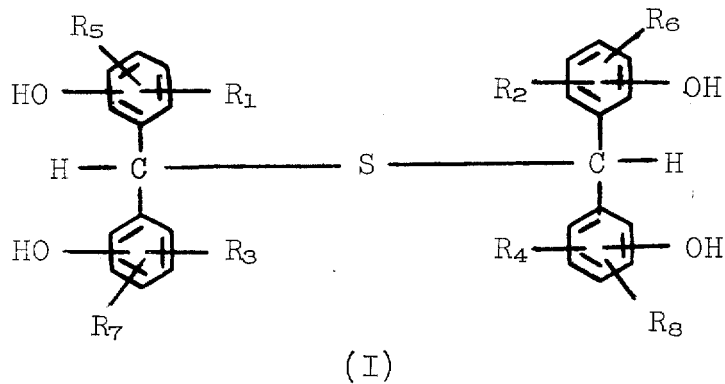

(I)

In Claim 1, column 6, the bottom right-hand benzene ring reading:

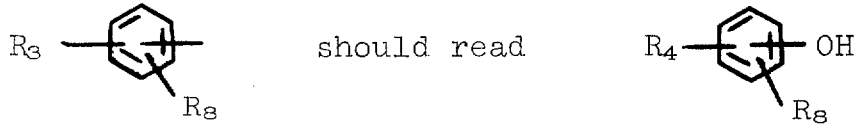

Signed and sealed this 8th day of May 1973.

(SEAL)
Attest:

EDWARD M. FLETCHER, JR.　　　　　　　ROBERT GOTTSCHALK
Attesting Officer　　　　　　　　　　Commissioner of Patents